May 31, 1932. A. BÜCHI 1,860,449
DOUBLE ACTING INTERNAL COMBUSTION ENGINE WITH
EXHAUST TURBINES AND CHARGING AIR COMPRESSORS
Filed March 7, 1929   3 Sheets-Sheet 2

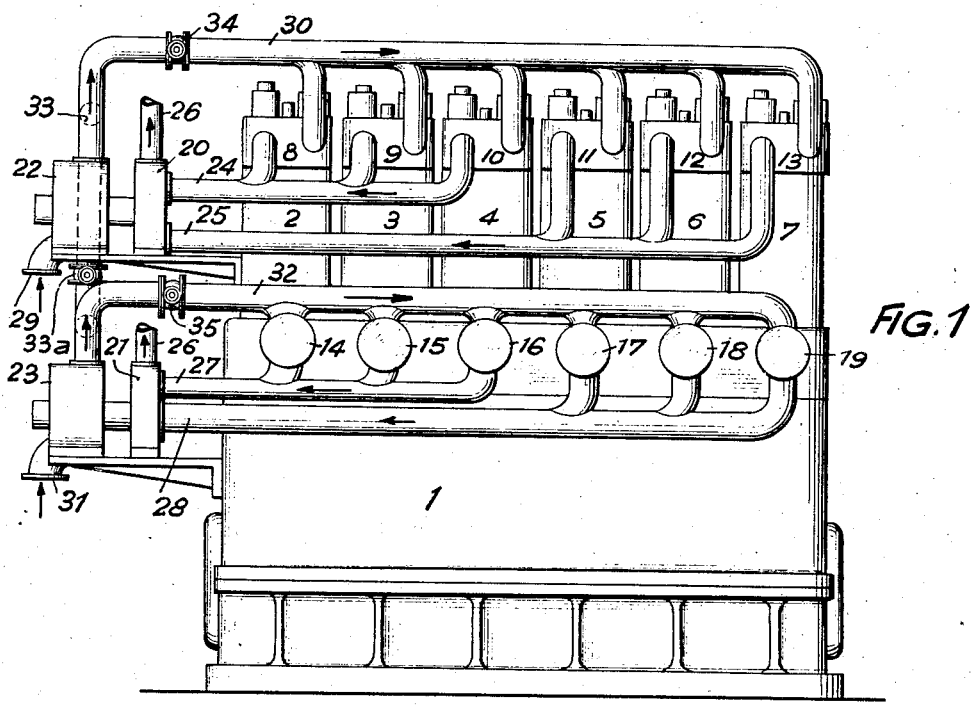
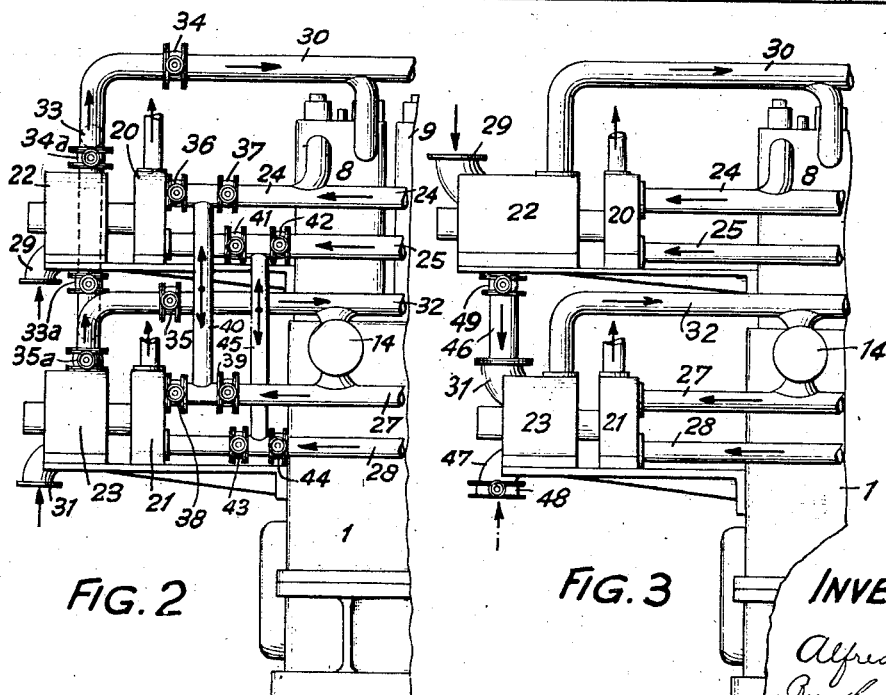
FIG.1
FIG.2
FIG.3

INVENTOR:
Alfred Büchi,
By Henry Ortz Jr.
Atty.

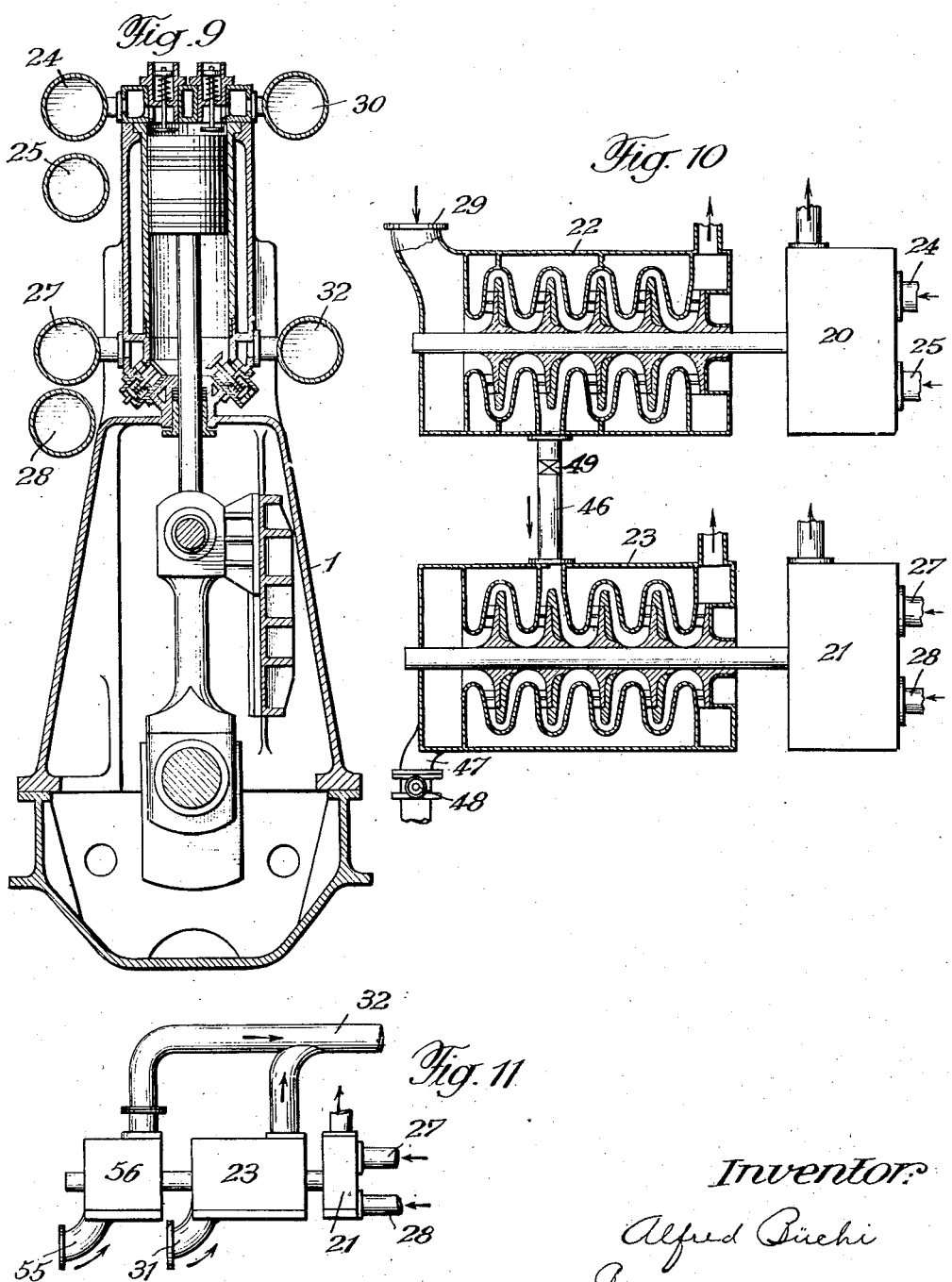

Patented May 31, 1932

1,860,449

UNITED STATES PATENT OFFICE

ALFRED BÜCHI, OF WINTERTHUR, SWITZERLAND

DOUBLE ACTING INTERNAL COMBUSTION ENGINE WITH EXHAUST TURBINES AND CHARGING AIR COMPRESSORS

Application filed March 7, 1929, Serial No. 345,093, and in Switzerland March 10, 1928.

The present invention refers to a double acting internal combustion engine having exhaust turbine driven compressors for charging purposes and its subject matter consists in that for the outer and inner sides of the cylinders separate exhaust turbines driving compressors for charging purposes are provided in order to be able to work the engine with different pressures on the different sides of the cylinders. The arrangement may also be such that the compressor for the outer side of the cylinders and that for the inner side of the cylinders discharge into charging air conduits which are interconnected in order to obtain the same charging pressure at the inner and outer sides of the cylinders in spite of unequal pressures of the combustion gases in front of the exhaust turbines. Further the charging compressors for the outer and inner sides of the cylinders may be differently rated and their pressure conduits may be connected with each other so that for the purpose of increasing the delivery of air to the one side of the cylinders a portion of the air compressed in the compressor for the other side of the cylinders may be led to the first mentioned side of the cylinders. Thereby the additional air supplied to the one compressor before, into or after the compressor may be taken from any pressure stage of the other compressor. For supplying this additional air an additional compressor may be provided on the shaft of the exhaust turbine driven compressor having to supply more air. Each of the two turbines may be provided with single entrance casing or a multi-chamber casing in which case into every chamber of the turbine only one group of cylinders exhausts.

Several constructional examples of the subject matter of the present invention are illustrated on the accompanying drawings, in which Fig. 1 shows a first embodiment of a double acting six-cylinder engine;

Figs. 2, 3, 4, 5 and 6 show modified arrangements.

Fig. 9 is a vertical sectional view through a cylinder of an engine according to this invention.

Fig. 10 is a view of exhaust turbines and interconnected compressors with the compressors in section Fig. 11 shows a modified arrangement of two blowers driven by an exhaust gas turbine.

Figure 4:
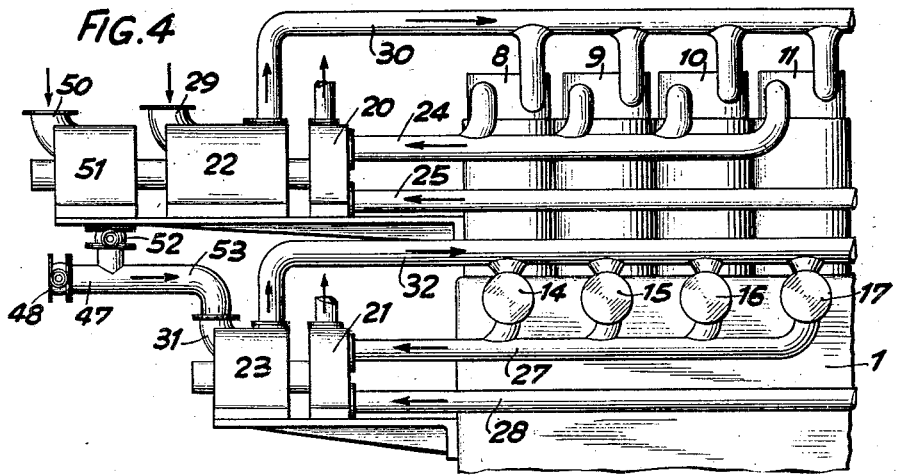

In Fig. 1, 1 denotes a six-cylinder double acting internal combustion engine having cylinders 2, 3, 4, 5, 6 and 7. The upper cylinder covers are designated with 8—13, the lower sides of the cylinders with 14—19. 20 and 21 respectively denote the two exhaust turbines provided for the outer and inner sides of the cylinders and which drive the compressors 22 and 23 respectively. The exhaust gases from the engine are supplied to the turbines by the conduits 24, 25 and 27, 28 respectively. These conduits lead the exhaust gases of every three engine cylinders to a separate chamber of the turbine. The exhaust gases leave the turbines through conduits 26. The compressors 22 and 23 respectively suck the air through the conduits 29, 31 respectively and the air is led to the cylinders by the conduits 30 and 32 respectively. Valves 34 and 35 respectively are inserted in the conduits 30 and 32 respectively by means of which the access of air to the inner or outer sides of the cylinders may be shut off. Further the conduits 30 and 32 are interconnected by the conduit 33 so that the same pressure adjusts itself in these conduits. This interconnection may be broken by closing the valve 33a.

In Fig. 2 a similar arrangement is shown which differs from that described above in as much as the exhaust conduits are modified. The sides of the cylinders 10, 11, 12, 13 and 15, 16, 17, 18, 19 respectively are not shown as they do not differ from Fig. 1. From the conduit 24 a conduit 40 leads to the conduit 27 and this conduit 27 may be closed by the valves 36, 37 and 38, 39 respectively against the outer and inner sides of the cylinders as well as against the sides 8—13 and 14—19 respectively of the cylinders and also against the turbines 20 and 21.

The conduit 25 is also connected to the conduit 28 by means of a connecting conduit 45. The latter may be closed by the valves 42 and 44 against the outer and inner sides of the cylinders and by the valves 41 and 43 against the turbines 20 and 21. This arrangement permits by completely opening all the valves 36, 37, 38, 39, 41, 42 and 43, 44 respectively to work simultaneously with all the cylinders and both sides of the latter on both turbines 20 and 21, or, for instance, by opening the valves 37 and 38, closing the valves 36 and 39 or opening the valves 42 and 43 and closing the valves 41 and 44 respectively only the outer sides of the cylinders work on the lower turbine 21 when, for instance, the inner sides of the cylinders are inoperative. By opening the valves 39, 36 and closing the valves 37, 38 or by opening the valves 44, 41 and closing the valves 42, 43 respectively the inner sides of the cylinders work on the upper turbine 20. With the arrangement shown in Fig. 2 it is possible to work with the one cylinder sides even if the other cylinder sides are out of service. This is even possible if the turbine of the latter ones is out of order and cannot be used. If, for instance, the one cylinder sides are cut out and the valves 36, 38, respectively 41, 43, are opened both turbines 20 and 21 are working, which may be of advantage in certain cases. If only one turbine is in operation obviously only one compressor is operative and the compressed air delivered by the compressor 22 may, for instance, be led to the lower sides 14—19 of the cylinders by closing the valve 34 and opening the valves 34a and 33a and closing valve 35a. Vice versa by closing the valves 35 and 34a and opening the valves 35a, 33a and 34 the compressed air generated by the operative turbine 21 may be led to the upper sides 8—13 of the cylinders. Also in this case a complete interchange of the delivery of the compressors 22 and 23 to the inner and outer sides of the cylinders is rendered possible. In case both turbines 20 and 21 are operative the total amount of charging air may be led into the conduits 30 and 32 respectively by opening the valves 34 and 35 simultaneously.

In Fig. 3 a constructional example is illustrated in which two different compressors 22 and 23 are provided. As regards the incomplete showing of the engine the same remarks hold good as made above with reference to Fig. 2. The compressor 22 sucks air through the conduit 29 and delivers it through conduit 30 to the outer sides of the cylinders. Further a tapping conduit 46 is arranged on this compressor by which compressed air is delivered from a higher stage of the compressor 22 through the branch 31 to the compressor 23. The latter supplies its air to the inner sides of the cylinders. The object of this arrangement is to lead a portion of the air compressed in the compressor 22 into the compressor 23 so that by the latter more air or air of a higher pressure is supplied to the inner sides of the cylinders. This is useful if it is intended to supply more air to the inner sides of the cylinders in order to get there a higher charge or an intensified scavenging, or to obtain lower combustion temperatures or a better combustion. This is rendered possible in the manner described even if the output of the turbine 21 is not sufficient for this supply of air. Provision is, however, made for the compressor 23 to suck air directly from the atmosphere through the branch 47 indicated in dotted lines. A valve 48 permits the closing of this branch when the compressor 23 works in series with the compressor 22 as described above.

The conduit 46 may be connected to any stage of the compressor 22, and care must be taken that the pressure conduit is connected to the compressor 23 in a point in which similar pressure is present.

As has been mentioned in the introductory part this additional supply of air from one turbine may be supplied by an additional compressor driven by said turbine or by any other source of power. This compressor may directly discharge into the air conduits 30 or 32 respectively. An arrangement of this type is illustrated in Fig. 4 in which 51 denotes the additional or auxiliary compressor driven by the turbine 20. The compressor 51 sucks atmospheric air through the branch 50 and delivers the compressed air through conduit 53 into the inlet branch 31 of the compressor 23 driven by the other turbine 21. In order to be able to have the compressor 23 suck directly from the atmosphere a conduit 47 closable by a valve 48 is provided. In this case the valve 52 has to be closed.

Figure 5:
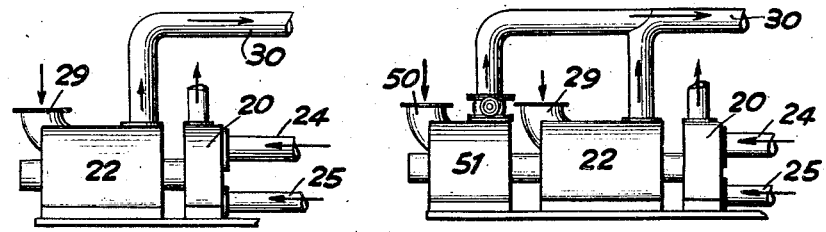
Figure 5:
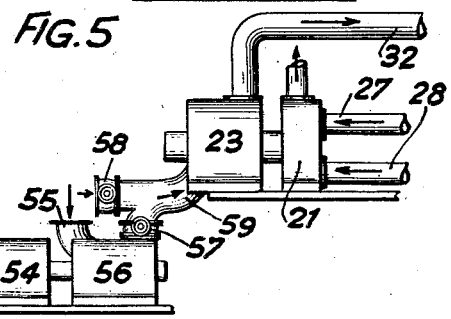

Fig. 5 illustrates an arrangement similar to that shown in Fig. 4, but differing from the latter inasmuch as the additional compressor 56 works in series with the compressor 23 and is driven by another source of power, for instance by an electromotor 54. In this case atmospheric air enters through the branch 55 into the compressor 56 and the air compressed in the latter is delivered through the conduit 59 to the compressor 23. In order to permit the compressor 23 to work without the assistance of the additional compressor 56 two valves 57 and 58 are arranged. When the auxiliary compressor 56 is operative the valve 58 is closed and the valve 57 opened; when the compressor 23 sucks air directly from the atmosphere the valve 58 is to be opened.

Figure 7:
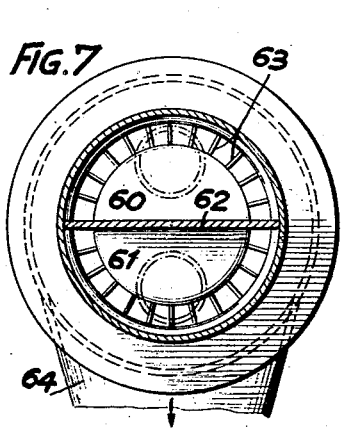
Fig. 7 is a section along line VII—VII in Fig. 8 through the exhaust turbine.
Figure 8:
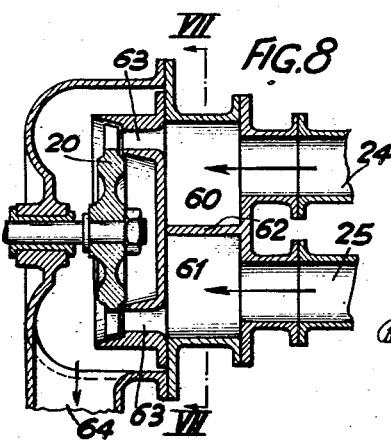
Fig. 8 is an axial section through the exhaust turbine.

Figs. 7 and 8 of the drawings illustrate an exhaust turbine having a two fold admission casing. 60 and 61 respectively designate the two parts of the admission casing separated from each other by a partition wall 62. The exhaust gas conduit 24 discharges into the part 60 and the exhaust gas conduit 25 into the part 61 of the admission chamber. Numeral 63 denotes the guide vanes and numeral 64 denotes the exhaust branch of the turbine.

Figure 6:
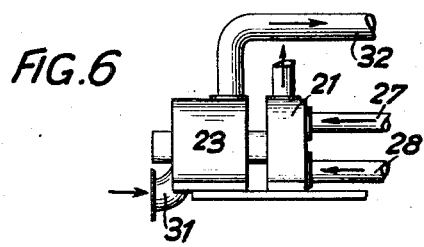

The auxiliary compressor 51 may also directly discharge into the air conduit 30 as is shown in Fig. 6; obviously the auxiliary compressor 56 may in a similar manner directly discharge into the air conduit 32.

According to the arrangement shown in Fig. 11, the compressors 23 and 56 are driven from the same turbine, and feed into the same delivery pipe 32.

I claim:

1. In a double acting internal combustion engine, in combination; cylinders having outer and inner operative sides, a first charging unit comprising an exhaust turbine, a compressor for charging air driven by said exhaust turbine, conduit means for the exhaust gases interposed between said outer sides of the cylinders and said exhaust turbine, conduit means for compressed air interposed between said compressor and the outer sides of the cylinders, a second charging unit comprising an exhaust turbine, a compressor for the charging air driven by said exhaust turbine, conduit means for the exhaust gases interposed between said inner sides of the cylinders and said exhaust turbine, conduit means for compressed air interposed between said compressor and the inner sides of the cylinders, and means interconnecting said conduit means for the exhaust gases to permit connecting the exhaust turbine of the first charging unit to the inner sides of the cylinders and the exhaust turbine of the second charging unit to the outer sides of the cylinders.

2. In a double-acting internal combustion engine in combination, cylinders having outer and inner operative sides, a first charging unit comprising an exhaust turbine, a compressor for the charging air driven by said exhaust turbine, conduit means for the exhaust gases interposed between said outer sides of the cylinders and said exhaust turbine, conduit means for compressed air interposed between said compressor and the outer sides of the cylinders, a second charging unit comprising an exhaust turbine, a compressor for the charging air driven by said exhaust turbine, conduit means for the exhaust gases interposed between said inner sides of the cylinders and said exhaust turbine, conduit means for compressed air interposed between said compressor and the inner sides of the cylinders, means interconnecting said conduit means of the first charging unit to the inner sides of the cylinders and the exhaust turbine of the second charging unit to the outer sides of the cylinders, and means interconnecting said conduits for charging air to attain the same charging pressure on both sides of said cylinders in spite of unequal pressures of the combustion gases in front of the two exhaust turbines.

3. In a double-acting internal combustion engine, in combination; cylinders having outer and inner operative sides, a first charging unit comprising an exhaust turbine, a compressor for the charging air driven by said exhaust turbine, conduit means for the exhaust gases interposed between said outer sides of the cylinders and said exhaust turbine, conduit means for compressed air interposed between said compressor and the outer sides of the cylinders, a second charging unit comprising an exhaust turbine, a compressor for the charging air driven by said exhaust turbine, conduit means for the exhaust gases interposed between said inner sides of the cylinders and said exhaust turbine, conduit means for compressed air interposed between said compressor and the inner sides of the cylinders, said exhaust turbines being provided with a multi-chamber inlet casing, and groups of cylinders exhausting into said chambers of the inlet casing.

In testimony whereof I have signed my name to this specification.

ALFRED BÜCHI.